United States Patent [19]

Schoonover et al.

[11] 3,934,200

[45] Jan. 20, 1976

[54] TACHOMETER CIRCUIT

[75] Inventors: Stanley C. Schoonover, Waynesboro; Michael D. McIntosh, South Mountain, both of Pa.

[73] Assignee: Landis Tool Company, Waynesboro, Pa.

[22] Filed: Jan. 31, 1975

[21] Appl. No.: 545,993

[52] U.S. Cl............... 324/163; 324/164; 324/16 R; 324/132; 307/229; 328/142
[51] Int. Cl.² ............................................ G01P 3/46
[58] Field of Search.......... 324/163, 164, 166, 16 R, 324/132; 307/230; 328/142

[56] References Cited
UNITED STATES PATENTS

| | | | |
|---|---|---|---|
| 3,178,641 | 4/1965 | Varterasian | 324/164 |
| 3,371,224 | 2/1968 | Polo | 307/230 |
| 3,371,269 | 2/1968 | Wattson | 307/230 |
| 3,644,836 | 2/1972 | Johnson | 328/143 |

*Primary Examiner*—R. V. Rolinec
*Assistant Examiner*—Vincent J. Sunderdick
*Attorney, Agent, or Firm*—Spencer T. Smith

[57] ABSTRACT

A D.C. tachometer circuit comprising a non-linear D.C. tachometer which produces an output voltage having an A.C. ripple, a first current path from the D.C. tachometer including means for removing the D.C. component of the output voltage of the tachometer, means for inverting and isolating the A.C. voltage ripple, and means for eliminating drift and the D.C. level of the inverted and isolated A.C. voltage-ripple, means for mixing the original output voltage of the D.C. tachometer including the A.C. ripple and the inverted and isolated A.C. voltage ripple to establish a non-linear ripple-free output voltage, and means for linearizing the non-linear ripple-free output voltage.

9 Claims, 2 Drawing Figures

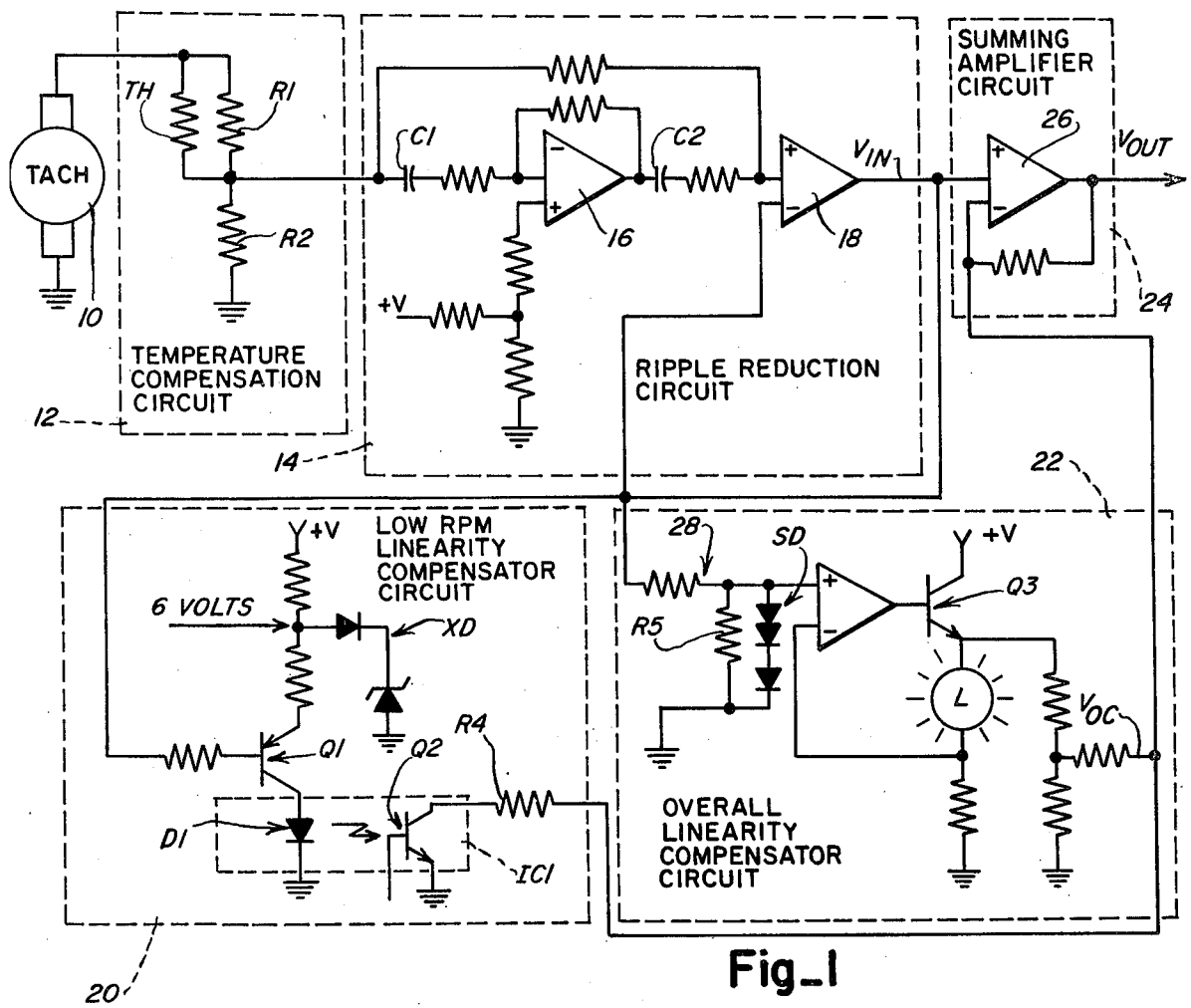
Fig_1
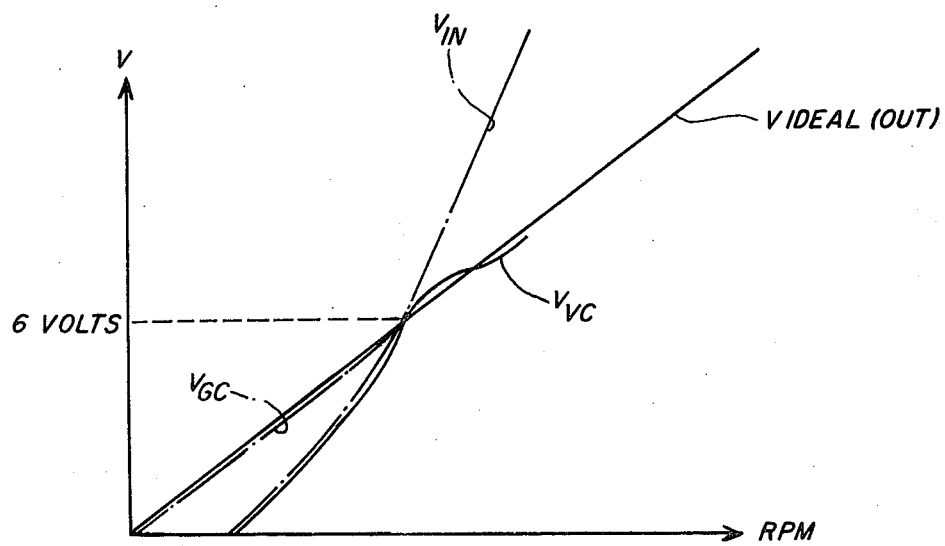
Fig_2

TACHOMETER CIRCUIT

The present invention relates to D.C. tachometers, and more particularly, to a method of reducing the A.C. voltage ripple present in the output voltage of a D.C. tachometer.

D.C. tachometers are often utilized in control circuits where the presence of an A.C. ripple on the output voltage would interfere with the orderly operation of a machine such as a machine tool.

The most common approach to this problem is to utilize brush type D.C. tachometers where there is little, if any, A.C. voltage ripple. This solution, however breeds its own problems, since brush type tachometers require periodic servicing.

It is, accordingly, an object of the present invention to convert the output voltage of a D.C. tachometer into a ripple-free output voltage.

It is another object of the present invention to convert the non-linear output voltage of the tachometer into a substantially linear output voltage.

Other objects and advantages of the present invention will become apparent from the following portion of this specification and from the accompanying drawings which illustrates in accordance with the mandate of the patent statutes, a presently preferred embodiment incorporating the teachings of the invention.

Referring to the drawings:

FIG. 1 comprises an electronic diagram illustrating a D.C. tachometer circuit having a conpensated ripple-free D.C. voltage output made in accordance with the teachings of the present invention, and FIG. 2 is a graphic representation of the compensated output tachometer voltage as a function of speed.

As can be seen from the drawing, the tachometer circuit includes a brushless D.C. tachometer 10, which produces an output voltage having an A.C. ripple. The tachometer is temperature compensated by means of a temperature compensating network 12 including a thermistor TH and first and second resistors R1, R2. The output voltage of the tachometer will, accordingly, be constant, at a given speed, regardless of tachometer temperature.

The output voltage of the tachometer is supplied to a ripple reduction circuit 14, wherein the D.C. component of the output voltage is removed by a first capacitor C1. The A.C. voltage ripple present in the output voltage of the D.C. tachometer is then supplied to a unity gain amplifier 16, which inverts and isolates the A.C. voltage ripple and creates an inverted voltage representative of the A.C. voltage ripple. A D.C. bias voltage V is supplied to the unity gain amplifier 16 to keep the output from swinging negative. The inverted voltage representative of the A.C. voltage ripple is then supplied to a second capacitor C2, which eliminates drift and the D.C. level of the unity gain amplifier output. The capacitor values may be changed to accommodate different ripple frequencies and phase lags.

The output voltage of the D.C. tachometer 10 including the A.C. ripple, is then mixed with the inverted voltage which is representative of the A.C. ripple in a second unity gain amplifier 18, whereby a ripple-free output voltage $Vin$ will be produced.

The ripple-free output voltage $Vin$, which is not linear (FIG. 2) is conjointly supplied to a low RPM linearity compensator circuit 20, an overall linearity compensator circuit 22, and a summing amplifier circuit 24.

The overall linearity compensator circuit 22 produces a current through light source L which is proportional to the input voltage $Vin$ supplied to the circuit. A driver transistor Q3 provides current to the light bulb L as a function of input voltage $Vin$. Since a lamp has a non-linear V-I characteristic, the voltage developed across the lamp will not be in direct proportion to the current through it. As the current in the lamp goes up there is an increase in the voltage when compared to a linear element. This generates a non-linearity which is similar to the non-linearity of the tachometer. A voltage divider 28 is provided to assure that the proper current range is supplied to the light bulb L and a plurality of series connected diodes SD are connected in parallel with resistor R5 of the voltage divider 28 to effectively limit the current supplied to the light bulb L.

An output voltage divider is provided to supply an overall compensating voltage VOC which is a percentage of the output voltage from the light bulb L to the summing amplifier circuit 24. The output voltage VOC of the overall linearity compensator circuit 22 which is supplied to the negative input terminal of the summing amplifier is summed with the ripple-free, temperature compensated tachometer voltage $Vin$ which is supplied to the positive terminal of the summing amplifier circuit 24 to produce a compensated output voltage $Vvc$, $Vvc$, which closely traces the ideal output voltage curve ($Videal$) when the output voltage $Vin$ exceeds 6 volts.

When the ripple-free output voltage $Vin$ is less than 6 volts, a first transistor Q1 and a light emitting diode D1 of optical coupler IC1 will be on. A second transistor Q2, which is a component of the optical coupler, will accordingly be turned on thereby developing a resistance from output across the second transistor Q2 to ground which increases as the output voltage $Vin$ increases from 0 to 6 volts. The gain of the summing amplifier 26 which is a function of the resistance of the second transistor will accordingly decrease from a predetermined level greater than one to approximately one as the output voltage increases from 0 to 6 volts. The resistance of R4 which effectively controls the maximum gain of the summing amplifier 26, is selected to effect a gain compensation $Vgc$ (FIG. 2) of the voltage compensated output voltage $Vvc$ at the summing amplifier 26 to increase this voltage to approximately $Videal$ for output voltages $Vin$ less than 6 volts.

A temperature compensated Zener diode XD is provided to accurately control the point when the first transistor turns off. The summing amplifier accordingly will function near a unity gain amplifier whenever the output voltage $Vin$ exceeds 6 volts.

What is claimed is:

1. A D.C. tachometer circuit comprising
   a non-linear D.C. tachometer which produces an output voltage having an A.C. ripple,
   a first current path from said D.C. tachometer including
   means for removing the D.C. component of the output voltage of the D.C. tachometer,
   means for inverting and isolating the A.C. voltage ripple,
   means for eliminating drift and the D.C. level of the inverted and isolated A.C. voltage ripple,
   means for mixing the original output voltage of the D.C. tachometer including the A.C. ripple and the inverted and isolated A.C. voltage ripple to establish a non-linear ripple-free output voltage, and means for linearizing said non-linear ripple-free output voltage.

2. A non-linear D.C. tachometer circuit according to claim 1 wherein said linearizing means further comprises overall linearity compensator means.

3. A non-linear D.C. tachometer circuit according to claim 2, wherein said linearizing means further comprises summing amplifier means for summing said non-linear ripple-free output voltage and the voltage produced by said overall linearity compensator means.

4. A non-linear D.C. tachometer circuit according to claim 3, further comprising means for selectively varying the gain of said summing amplifier for compensating the output voltage of the D.C. tachometer at low RPM'S.

5. A non-linear D.C. tachometer circuit according to claim 4, wherein said tachometer is brushless.

6. A non-linear D.C. tachometer circuit according to claim 5, wherein said removing means comprises a capacitor.

7. A non-linear D.C. tachometer circuit according to claim 6, wherein said inverting means comprises a unity gain amplifier.

8. A non-linear D.C. tachometer circuit according to claim 7, wherein said eliminating means comprises a second capacitor.

9. A non-linear D.C. tachometer circuit according to claim 8, wherein said mixing means comprises a second unity gain amplifier.

* * * * *